UNITED STATES PATENT OFFICE.

RUDOLF LANGHANS, OF BERLIN, GERMANY.

FILAMENT FOR INCANDESCENT LIGHTS.

SPECIFICATION forming part of Letters Patent No. 420,881, dated February 4, 1890.

Application filed April 5, 1888. Serial No. 269,733. (No specimens.) Patented in Germany November 9, 1887, No. 44,183; in France February 15, 1888, No. 188,736; in England February 18, 1888, No. 2,438; in Belgium February 20, 1888, No. 80,705, and in Italy February 21, 1888, XLV, 248.

*To all whom it may concern:*

Be it known that I, RUDOLF LANGHANS, a subject of the Emperor of Austria, and residing at Berlin, Kingdom of Prussia, Germany, have invented new and useful Improvements in Filaments for Incandescent Electric Lamps, (for which I have received a patent in the following countries: In Germany, No. 44,183, dated November 9, 1887; in England, No. 2,438, dated February 18, 1888; in France, No. 188,736, dated February 15, 1888; in Belgium, No. 80,705, dated February 20, 1888, and in Italy, No. 248, Vol. XLV, dated February 21, 1888,) whereof the following is a specification.

My invention relates to a filament for incandescent electric lamps, which consists in a vein or core made of certain salts, both components whereof are metallic oxides, and which salts are themselves conductors of electricity, the said vein or core being coated with a substance having a higher conductive capacity than the former, and whereby the conduction of the current to the core is promoted. The basic constituent of the said salts consists in one or more of the oxides of the earth metals, calcium, magnesium, barium, strontium, aluminium, beryllium, cerium, lanthanum, didymium, erbium, terbium, yttrium, and gallium, while their acid component is formed by one or more of the oxides of the metals titanium, uranium, zirconium, molybdenum, and thorium, the latter class of oxides when brought together with the former at high temperatures assuming, as is well known, the character of acids and combining therewith to form salts. The coating by which I cover the filaments produced from the said salts consists in carbon, silicon, or boron.

One mode of proceeding for carrying out the invention is as follows: A thread or filament of vegetable substance is treated with sulphuric acid, in view of swelling the same. It is thereupon freed from the acid by means of caustic ammonia or carbonate of ammonia, and after having been carefully washed with water it is dried. The thread thus prepared is impregnated with one or more of the aforesaid oxides of the first series, (or basic oxides,) and with one or more of those of the second series (or acid-forming oxides.) This may be done with advantage by dissolving the basic oxide or oxides in hydrochloric, acetic, or other suitable volatile acid in excess, adding to the solution one or more of the acid-forming oxides, and steeping the thread in the said solution. The impregnation of the thread is very much promoted by carrying out the operation *in vacuo*, and in order to incorporate the greatest possible quantity of the oxides into the thread the impregnating operation is repeated several times, the thread being dried after every operation. The thread is then cut into pieces of the requisite length to which the desired form is given, and these pieces are suspended in an open crucible and glowed while being exposed to the air. In order to avoid distortions, it is, however, preferable to perform the glowing while the threads are embedded in an oxidizing-powder—such as magnesia or carbon containing an excess of oxygen—these substances being powerful absorbents of the oxygen of the air, while they give it off in heated state. By means of the said glowing process the hydrochloric, acetic, or other volatile acid employed for dissolving the oxides is split off. The oxides freed therefrom are caused to combine and to form salts with metallic acid, (metallates,) and the vegetable substance of the thread is destroyed, so that subsequent to the glowing filaments remain, which consist of the said metallates in the state of an amorphous dense mass, and which completely retain the shape of the original vegetable base.

A modification of the described glowing process consists in first glowing the impregnated threads while being embedded in an indifferent pulverulent substance—such as graphite—in view of expelling the hydrochloric, acetic, or other acid and destroying the vegetable base, and in then exposing them to the oxidizing glowing operation for producing the union of the oxides to metallates.

Another mode of carrying out the whole process, which has the advantage of obviating the use of acid solvents, is as follows: The oxides selected from the two groups are mixed together with liquid or molten heavy hydrocarbons to form a dough. This dough is pressed into filaments, or it is rolled into thin sheets which are cut into narrow strips. The filaments or strips thus obtained are first carefully glowed in a manner to oxidize and destroy the hydrocarbon, and thereupon glowed at a higher temperature for combining the metallic oxides. This mode of proceeding is, however, available only with mixtures of oxides in which one of the oxides is fusible or adapted to sinter, together with the other oxide or oxides, at the temperature employed for producing the combination.

In case the metals of the oxides to be combined are at hand, an alloy may be made thereof and wires formed out of the said alloy by pressing or drawing. These wires are then carefully oxidized, the oxidizing process being carried out slowly, as otherwise portions of the material are apt to fly off. Subsequently the filaments, which at the time consist but of a mixture of the oxides, are exposed to a heat sufficient to cause the said oxides to act chemically upon each other and to combine so as to form the required salts.

For the purpose of covering the filaments produced by any one of the described processes with a coating of carbon, silicon, or boron, they are glowed with exclusion of air in an atmosphere of suitable compounds of the said substances. The filaments may, for instance, be heated while being suspended in a closed crucible through which a current of carbureted, siliciureted or borated hydrogen, or any mixture thereof, is passed; or they are packed into the crucible with alternate layers of graphite and solid hydrocarbons—such as naphthaline, paraffine, and anthracine—and heated to incandescence; or the coating is performed by passing an electric current through the filaments while they are surrounded by vaporized or gaseous hydrocarbons or other gaseous compounds of carbon having the property of giving off carbon in the heat. The carbon, silicon, or boron is thereby deposited on the filaments in a compact layer firmly adhering thereto.

In all filaments hitherto employed in electric incandescent lamps and in which is incorporated a mineral substance in view of increasing their light-emitting power the mineral component is a non-conductor of electricity, which is brought into luminous state by the transferrence to the same of the heat resulting from the passage of the current through the conductive component. This mode of producing light has, however, the main defect that the electric energy consumed is but partly converted into light, and in addition thereto it is accompanied by other inconveniences.

In the new filaments produced, as described, the mineral vein is, on the contrary, itself a conductor of electricity, and is therefore directly acted upon by the current, while it presents sufficient resistance to become luminous by the passage of the same. The substances composing the veins have a great light-emitting power, which is even superior to that of the individual oxides. They are infusible and refractory even at the highest temperature to which they may be exposed in the lamps. They are in no wise decomposed by the current. They remain unchanged by their contact in incandescent state with carbon, silicon, or boron, and the veins possess considerable strength. If, however, the filaments were to consist of the mineral veins alone, they would require currents of great tension, whereas for known reasons currents of low tension have to be employed in practice. In order to allow such low-tension currents to be used with the said veins, these are covered with the coatings of carbon, silicon, or boron, which assist in conducting the current to the veins especially in their state of incandescence. Moreover, as the veins and the coatings present different resistance to the current, a tensional difference accrues whereby the total sectional resistance is increased, the result thereby obtained being that the radiating energy produced by the current consists almost entirely in light, with very little heat, the electric energy being thus utilized to the greatest possible extent. Besides, the said coating allows of the production of a filament having throughout equal thickness and therefore in all its sections uniform resistance. The coating being more ductile than the mineral vein, protects the latter from deteriorations, such as its becoming fissured or the splitting off of particles, which would be inevitable if the vein were uncovered. It insulates the vein against the action of gases; and, finally, the unequal expansion of the vein and the coating operates to further increase the sectional resistance of the filament, inasmuch as both undergo an alteration of condition, which produces in the substance of the coating and probably also in the mineral vein an increase of conductive resistance.

I claim as my invention—

A filament for incandescent electric lamps, consisting in a vein or core composed of salts, the basic component of which consists of an oxide or oxides of earthy metal, and the acid component, of that class of oxides which in the presence of the former and on exposure to high temperature assume the character of acids, the vein or core being coated with material of higher electric conductive capacity than the core, substantially as heinbefore set forth.

In testimony whereof I have hereunto set my hand in the presence of two subscribing witnesses.

RUDOLF LANGHANS.

Witnesses:
 B. Roi,
 ARTHUR MARKS.